March 2, 1965

R. P. LARKINS ETAL
HYDRODEALKYLATION REACTOR SYSTEM 3,171,862

Filed March 27, 1961

INVENTORS.
ROBERT P. LARKINS,
EWELL A. CLARKE,
NORMAN E. LUKER,
ROBERT L. MARTIN,
ELROY J. PRATT,

BY
ATTORNEY.

United States Patent Office 3,171,862
Patented Mar. 2, 1965

3,171,862
HYDRODEALKYLATION REACTOR SYSTEM
Robert P. Larkins, Ewell A. Clarke, Norman E. Luker, Robert L. Martin, and Elroy J. Pratt, all of Baytown, Tex., assignors, by mesne assignments, to Esso Research and Engineering Company, Elizabeth, N.J., a corporation of Delaware
Filed Mar. 27, 1961, Ser. No. 98,389
20 Claims. (Cl. 260—672)

The present invention deals generally with the control of exothermic reactions having a reaction rate which increases with increasing temperature. More particularly, the present invention deals with a method and means for controlling the temperature within a reactor during the thermal hydrodealkylation of alkylated aromatic hydrocarbons. In another aspect, the present invention deals with a specific nozzle design for injecting a fluid heat-transfer medium into a flowing stream.

The thermal non-catalytic hydrodealkylation of alkylated aromatic hydrocarbons is a highly exothermic reaction when conducted in the presence of hydrogen at pressures from 400 p.s.i.a. to 800 p.s.i.a. and temperatures from about 1000° F. to about 1600° F. This process is representative of exothermic reactions with temperature-sensitive rates. Where these reactions are carried out in an open bore reactor, the highly exothermic nature of the reactions, combined with the fact that the rate accelerates with temperature, results in an exponential rise in temperature with respect to residence time in the reaction zone. In the absence of means for controlling temperature within a rather critical time lapse, a process upset would proceed out of control and, in the case of dealkylation, would result in heavy coking within the reactor and extreme loss of product by reason of degradation in side reactions. It has been found in the dealkylation reaction that plant disturbances normally experienced can cause the reactor temperature to increase more than 200° F. within 15 seconds unless the control system is responsive to correct the upset conditions in a fraction of that time. It is apparent, therefore, that the control system is highly important in the commercial application of the reaction.

The hydrodealkylation reaction above discussed comprises the treatment of alkylated aromatic hydrocarbons such as toluene, xylene, trimethyl benzenes, ethyl benzene, diethyl benzene, triethyl benzene, methyl ethyl benzenes, methyl naphthalenes, ethyl naphthalenes, etc. as relatively pure feed stocks or in admixture with each other or in admixture with paraffin hydrocarbons. An exemplary feed stock may be obtained, for example, from a catalytic reformate by $SO_2$ solvent extraction, and may exhibit the following properties:

TABLE I

Constituent breakdown

| | Percent |
|---|---|
| Toluene | 98 |
| Benzene | 1 |
| Paraffins | 1 |

Other feed stocks could be obtained from catalytic cracking unit heating oil by solvent extraction, e.g., with phenol, or from extracted kerosene fractions from straight run stocks.

It should be noted that the presence of cycloparaffins or alkyl cycloparaffins and tetralin do not adversely affect the operation of the hydrodealkylation, being aromatized and/or at least partially dealkylated during the process.

The reactor is normally operated at a temperature of between 1000° F. to about 1600° F., preferably between 1100° F. and 1400° F., with the hydrocarbon plus hydrogen feed being preheated, for example, before introduction into the reactor to a temperature of about 1150° F., with the temperature rising by reason of the exothermic nature of the reaction to a desired optimum temperature of about 1330° F. By the practice of the present invention, the pressure within the reactor is maintained within the range of about 400 p.s.i.a. to about 800 p.s.i.a., with the hydrogen to hydrocarbon ratio of feed stocks being maintained within the range of about 4000 s.c.f. per barrel of hydrocarbon feed to about 18,000 s.c.f. of hydrogen per barrel, depending on conversion level and paraffins in the feed. The residence time within the reactor may range between about 2 seconds to about 120 seconds, preferably between 10 and 60 seconds.

The nature and extent of the present invention may be more fully understood by reference to the drawings in which.

Figure 1:
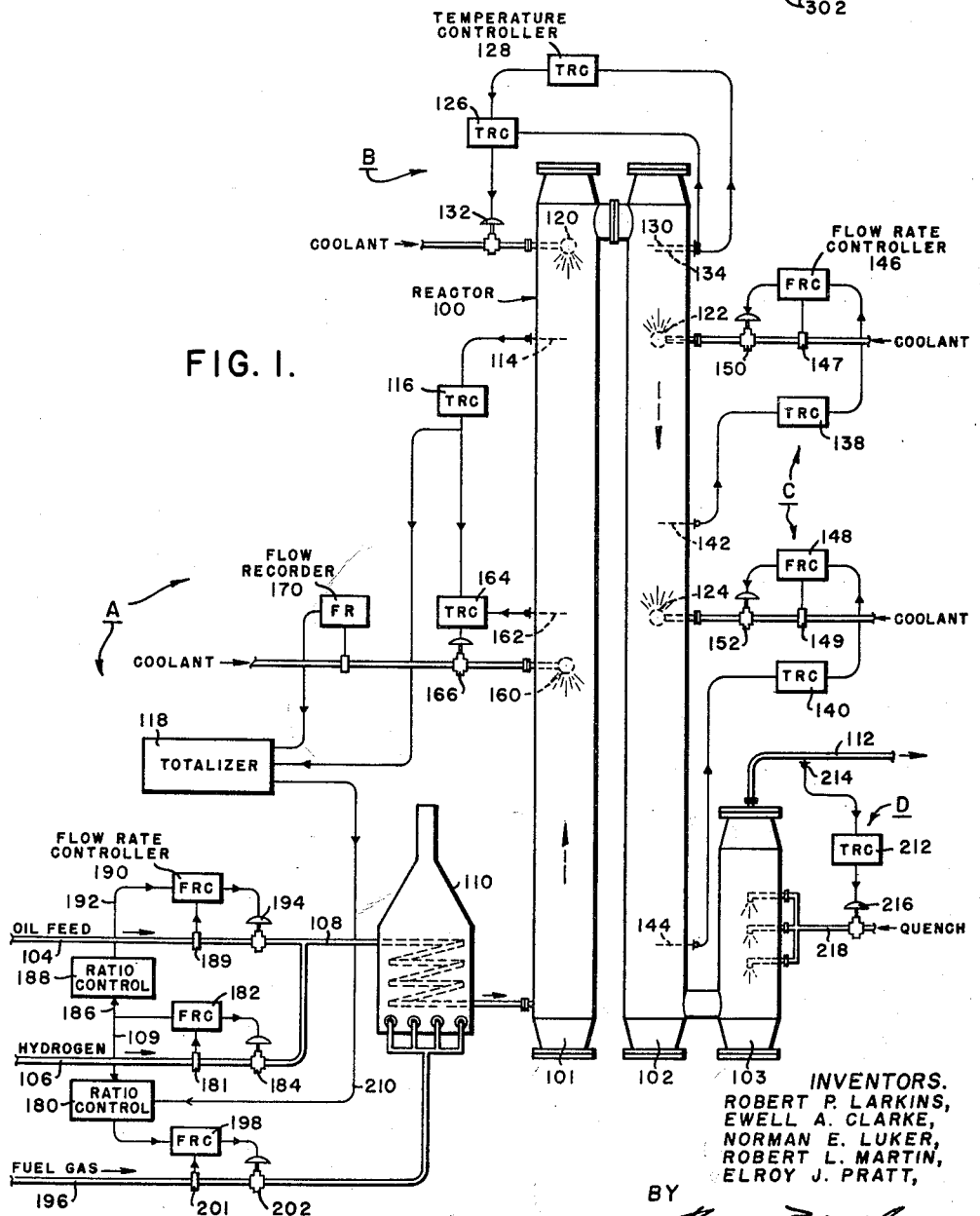
FIG. 1 represents schematically the thermal dealkylation reactor system of the present invention, including the control means therefor.

Referring now to FIG. 1, the control system of the present invention is shown as comprising four types of control loops, generally indicated as loops A, B, C, and D. These loops are combined to provide an extremely sensitive control system having particular application in controlling the highly exothermic reaction being carried out in a thermal dealkylation reaction. The reaction is accomplished in reactor 100 which is made up of three communicating sections 101, 102, and 103. It should be understood that a single continuous section could be utilized, or the reactor otherwise formed without affecting the practice of the present invention. The reactants are admitted into the reactor by various means, the hydrocarbon being admitted through line 104 and the hydrogen by way of line 106. The hydrogen and hydrocarbon are combined in line 108 before passage through a heater 110 which may suitably comprise a gas-fired furnace, and are introduced into section 101 of the reactor 100 at the lowermost portion thereof. The reactants pass sequentially upwardly through section 101, downwardly through section 102, and upwardly through section 103 to be discharged by way of products line 112. During the passage of the reactants through the reactor system, the exponential rise in temperature with residence time is controlled by the injection of coolant, preferably hydrogen, at spaced points within the reactor. In particular, the optimum temperature for the reaction may be controlled at a maximum of about 1330° F. (for 80% conversion per pass), beginning at about the upper portion of section 101 of the reactor, or at about 45% of the distance through the reactor. It should be noted that the reactants are discharged from the heater 110 at a temperature well below the optimum, e.g., at about 1150° F.

The control loop A is provided to accomplish three results:

(1) To maintain the hydrogen to hydrocarbon ratio within desirable limits;

(2) To reduce fuel rate to furnace 110 in the event of a partial loss of hydrogen supply; and (3) To control the temperature of reactants during the initial portion of the reaction where the temperature is rapidly rising to the desired maximum.

In this connection, it should be remembered that the reactants are introduced into the reactor at a temperature well below the optimum hydrodealkylation temperature, and the greatest rate of temperature rise and concomitant increase in reaction rate therefore will be accomplished in the inlet portion of the reactor 100. The control loop A is therefore of prime importance.

Control loop A is set up as follows: The hydrogen-containing stream is brought into the system by line 180, controlled by flow controller 182 (responsive to orifice meter 181) which actuates valve 184. A signal proportional to the rate of flow is generated, for example, by the orifice meter 181, and is transmitted to ratio controller 188 by way of line 186. The hydrogen-containing stream to be used both as an initial charge to the unit and for use as a coolant may comprise about 50% to 60% hydrogen, with the remainder of the stream being hexanes and lighter, preferably propane and lighter. The hydrogen content of the coolant streams may be lower than that of the initial charge to the unit, but preferably is higher than 50% to 60%. Where the paraffins in the coolant stream are hexanes and lighter, the hydrogen content may be lower than where the higher paraffins are present. This is so because the heavier paraffins undergo thermal cracking and absorb some of the hydrogen present in the reaction atmosphere. The hydrogen-to-hydrocarbon ratio, that is, standard cubic feet of hydrogen per barrel of hydrocarbon feed, is calculated on the basis of the hydrogen content of the hydrogen-containing stream.

The rate of flow of the hydrocarbon through line 104 is controlled by orifice meter 189 and flow controller 190, which actuates valve 194. The ratio controller 188 transmits a signal proportional to the desired rate of hydrocarbon flow to controller 190 via line 192. The ratio controller 188 varies the hydrocarbon rate of flow in response to changes in the hydrogen rate of flow to maintain the hydrogen-to-hydrocarbon ratio at the desired value.

Fuel gas for the heater 110 is introduced via line 196, and the rate of flow is controlled by orifice 201 and flow controller 198 by means of valve 202. A signal proportional to the hydrogen rate of flow is tranmitted by orifice meter 181 to ratio controller 180 by way of line 109. This ratio controller transmits a signal to flow controller 198 proportional to the desired rate of fuel gas flow, and operates in a manner generally similar to controller 188 to provide fuel gas in a desired proportion to the hydrogen flow (and consequently proportional to hydrocarbon flow and to the total flow in line 108). The controller 180 differs from ratio controller 188 in one important aspect, however. The ratio of fuel gas flow to hydrogen flow is adjusted by instruments responsive to reactor temperature, as is set forth more fully hereinbelow.

Under normal operations, the hydrocarbon and hydrogen are introduced into the reactor at about 1150° F., and the exothermic reaction is allowed to proceed without quenching until the temperature rises to about 1330° F. If the temperature rises too rapidly, the rate of flow of the fuel gas is reduced to lower the inlet temperature. The response of outlet temperature to a change in fuel to furnace 110 is characteristically slow. While the furnace is responding, a second means for lowering the temperature within the reactor is employed; i.e., the injection of a coolant stream via nozzle 160 which is located at a position removed from the inlet end of said reactor. This coolant stream may comprise water, steam, hydrogen, hydrocarbon, etc. at a temperature considerably lower than that obtained in the reactor. Of these two means, the coolant injection is intended for use only during periods of temporary, rapid increase in temperature, while the lowering of the fuel gas rate is to take place only if a continuing condition requiring coolant is encountered.

To the accomplishment of this end, then, the reactor 100 is provided with a "fast" thermocouple 162 (response time of about 0.3–6 seconds) located at a point downstream of nozzle 160. Temperature controller 164 is responsive to thermocouple 162, and actuates valve 166 to admit a quench stream when a high temperature surge occurs. At a point downstream of thermocouple 162 is a second thermocouple 114, having a response time at least five times that of thermocouple 162 and preferably about 5.0 seconds. If the control of temperature at thermocouple 162 is not sufficient to maintain the desired temperature at thermocouple 114, then controller 116 adjusts controller 164 (as a function of the amount that the sensed temperature exceeds the set point of controller 116) to cause more coolant to flow into the reactor. This is accompilshed by adjusting the set point of controller 164 to a lower temperature, thus increasing the flow of coolant but yet allowing the controller 164 to respond to quick, temporary fluctuations occurring during the upset period.

In order to return the reactor to normal operation (i.e., with quench 160 inactive), by lowering the inlet temperature, the rate of flow of quenching coolant is sensed by a flow recorder 170 which includes orifice meter 171 and which generates a signal proportional to that rate of flow. Temperature controller 116 generates a signal proportional to the temperature variance between the set point and reactor temperature which is passed to a totalizer 118. This totalizer also receives a signal proportional to the rate of flow measured by recorder 170 and is provided with means for adjusting the relative weight to be given to each signal. The output of totalizer 118 represents a weighted combination of the amount of quench stream being admitted and the variance from the optimum temperature. For example, the rate of flow may be given three to four times as much emphasis in the output signal as is given to the temperature variance. This output signal is carried via line 210 to set the ratio controller 180 to a position resulting in a lowered fuel flow, thereby correcting the upset conditions within the reactor section 101. Conversely, as the temperature begins to fall as a result of the lower fuel rate, the controller 116 will continue to adjust the set point of controller 164 until the flow of quenching coolant is terminated. Thus, the control loop A will be seen to provide means for maintaining the reactant charge streams in the correct ratio, and to provide a means for reducing the fuel gas input to the furnace 110 responsive to temperatures experienced within the reactor section 101 and to provide a means for rapid quenching of high temperatures while the fuel gas rate is being corrected. Control loop A also provides for raising furnace fuel if thermocouple 114 reads a temperature which is too low. The ratio controller 180 provides a further function, however. Upon a partial failure of the hydrogen stream, the fuel gas to the furnace 110 will be partially shut off and the oil will be reduced proportionately to prevent the furnace from being coked and plugged by thermal cracking of the hydrocarbon which would occur in the absence of the proper amount of hydrogen.

The temperature within the reactor at thermocouples 134, 142, and 144 downstream of the control loop A is maintained at the desirable maximum temperature by the introduction of a coolant (e.g., hydrogen) through nozzles 120, 122, and 124, which direct the coolant upstream in order to maximize backmixing of the coolant and the reactants. The hydrogen is introduced through nozzle 120 controlled by loop B which comprises two temperature controllers: controller 126, which is the primary controller, and controller 128, which is the secondary controller operating to set the temperature controller 126 to recalibrate the thermocouple 130 as is more fully set out hereinbelow. The temperature controller 126 is actuated by a "fast" theremocouple 130 which has a response time of about 0.3 to 6 seconds. That is to say, that 63% of the response to a change in temperature will be accomplished in about 0.3 to 6 seconds. As the temperature controller 126 responds to temporary fluctuations in temperature to control the coolant being introduced through nozzle 120, by adjusting control valve 132, the temperature being sensed by the thermocouple 130 should be maintained at or near the set point of controller 126. However, should the fast thermocouple drift as a result of fouling or diffusion of hydrogen into the sheath in the absence of a thermowell, the temperature may remain uncorrected by the action of controller 126. Under these conditions, the temperature controller 128 is actuated by a "slow" thermocouple 134 (about 5 to 30 seconds' response time and in a thermowell located adjacent to thermocouple 130) to adjust the temperature controller 126, resulting in the correct flow of the hydrogen. Thus, during periods of fast but temporary fluctuations, the coolant injection is controlled by controller 126, while over long periods, the temperature controller 128 will set the controller 126 to compensate for error in thermocouple 130. If thermocouple 130 should fail, thermocouple 134 may be used for temporary but slower control of the section. This control loop B of temperature controllers 126 and 128 provides then the optimum temperature control between quenches 120 and 122.

Subsequent in the process operations to the controllers 126 and 128 is provided temperature control loop C, comprising controllers 138 and 140 responsive to "slow" thermocouples 142 and 144 located as indicated in the mid portion and lower portion of the section 102. The thermocouples 142 and 144 have a response time of about 5 seconds. The hydrogen being introduced through nozzles 122 and 124 is controlled by flow rate controllers 146 and 148, responsive to orifice meters 147 and 149, acting on valves 150 and 152. The flow rate controllers are adjusted by the temperature controllers 138 and 140 to increase or decrease the flow of hydrogen into these secondary control points.

As the products leave the reactor through section 103, the reactants may be quenched to a temperature below about 1000° F. in order to stop the reaction. This is accomplished by means of a temperature control loop D which comprises a controller 212 responsive to a thermocouple 214 in the outlet line which operates valve 216 in quench line 218 to admit sufficient quenching material to slow the reaction to a negligible rate. The low reactants concentration in the product and the low temperature essentially preclude further temperature rise. The quench material in line 218 may be water, steam, hydrocarbons, hydrogen, etc.

The temperature controllers 164 and 126 preferably have proportional band, reset action, and rate action mechanisms. The other controllers may comprise only proportional band and reset action, but may also comprise rate action, if desired.

Control loops A and B preferably are composed of electronic instruments to reduce transmission lags. The control loops C and D may comprise electronic instruments, if desired, but pneumatic instruments are suitable.

Figure 2:
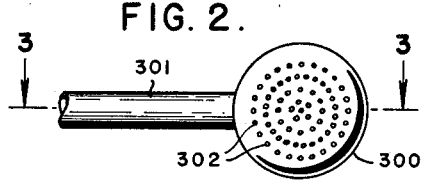
FIG. 2 is a face view of the particular header utilized in the present invention for introducing the coolant stream into the reactor.
Figure 3:
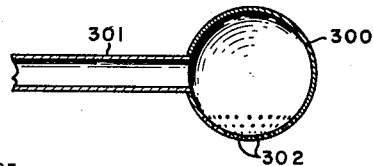
FIG. 3 is a view taken on line 3—3 of FIG. 2.

In the practice of the present invention, it has been found that the control of the temperature within the reactor has been particularly enhanced by utilizing a particular form of injection nozzle as indicated at 160, 120, 122, and 124. Referring now to FIG. 2 and FIG. 3, the particular nozzle is shown to be in the form of a sphere, which may suitably be suspended at the axis of the reactor. The spherical nozzle 300 is provided with an inlet line 301 to provide the nozzle with a fluid stream which is then discharged through radial passages 302. As is shown in the preferred design, these radial passages are spaced on the upstream side of the nozzle, and may extend about the face of the nozzle at spaced positions up to a location which directs the stream at an angle of about 45° from the vertical. Stated differently, the area of radial perforations lies within the spherical sector defined by the intersection with the surface of the sphere of a 90° cone having its vertex at the center of the sphere. The particular configuration of the nozzle 300 provides several advantages. Firstly, by directing the stream of cool material in a direction opposite to the flow of reactants, a backmixing of the material is promoted which tends to reduce the amplitude or spread the effect of disturbances which travel through the reactor, and tends both to reduce the magnitude of upsets and the response time requirements of the control mechanisms used with the reactor. At the same time, the nozzle promotes the rapid mixing of the quench with the reactants, to enable the temperature sensing means which are downstream of the nozzles to obtain a representative temperature response to collant injection. This rapid mixing is encouraged both by the direction of the cooling stream from the nozzle in a direction substantially opposite to the direction of flow and also from the strong vortex shedding which occurs on the downstream side of a sphere suspended in a flowing stream. In order to enhance the vortex shedding and mixing effect, the nozzle should be at least 25% of the diameter of the reactor at the point where the nozzle is inserted. Another feature which accompanies the use of the spherical nozzle is the absence of dead spaces behind the nozzle where carbon deposition could occur. It is anticipated that in the operation of the particular nozzle, the most advantageous rate of flow of the coolant material through the radial passages should be in excess of 30 feet per second. The number and diameter of the passages provided in the face of the nozzle are therefore determined by the area obtained by dividing the expected volume of coolant to be passed therethrough by the linear velocity (i.e., 30 feet per second or greater). If a liquid is injected as at 160, an atomizing spray nozzle is added just ahead of the spherical header which discharges a small amount of material constantly.

It should be recognized that the present invention although disclosed in connection with thermal hydrodealkylation of alkylated aromatic hydrocarbons has particular utility in controlling any highly exothermic reaction wherein the reaction rate accelerates with rising temperature. Accordingly, the scope of the invention should be determined not by the specific example above given, but merely by the scope of the appended claims.

We claim:

1. In a method of conducting an exothermic reaction in an elongated reaction zone having an inlet end and an outlet end, wherein the reactants are heated before introduction into said reaction zone at the inlet end thereof, and wherein a coolant is introduced into said reaction zone at a first point intermediate said inlet end and said outlet end to control said reaction, the improvement which comprises obtaining a first signal proportional to the temperature at a first position removed toward the outlet end of said zone from said first point wherein said coolant is introduced, employing said signal to control the introduction of said coolant, whereby exothermic reaction is controlled, obtaining a second signal proportional to the temperature at a second position removed toward the outlet end of said zone from both said first point and said first position, and modifying said first signal in accordance with said second signal, whereby the injection of said coolant at said first point may be maintained at a desired rate.

2. A method in accordance with claim 1 further comprising the steps of introducing a coolant at a second point removed toward the outlet end of said zone from said first and second positions and from said first point, obtaining a third signal proportional to fluctuations in temperature at a third position on the outlet side of said second point obtaining a fourth signal proportional to the temperature at said third position, utilizing said third signal to control the introduction of coolant at said second position, and utilizing said fourth signal to modify said third signal.

3. A method in accordance with claim 2 further comprising the steps of introducing a coolant at a third point on the outlet side of said third position, obtaining a fifth signal proportional to the rate of introduction of said coolant, obtaining a sixth signal proportional to the temperature at a fourth position on the outlet side of said third point, utilizing said fifth signal to control the rate of introduction of said coolant, and utilizing said sixth signal to modify said fifth signal, whereby said reaction may be controlled.

4. A method in accordance with claim 3 further comprising the step of quenching said reaction at a point adjacent said outlet end.

5. A method in accordance with claim 1 wherein said reaction is the thermal, non-catalytic hydrodealkylation of alkylated aromatic hydrocarbons.

6. A method in accordance with claim 5 wherein the alkylated aromatic hydrocarbon is toluene.

7. A method in accordance with claim 5 wherein the coolant is a hydrogen-containing gas.

8. A method in accordance with claim 5 wherein the coolant is steam.

9. In an elongated reactor for carrying out an exothermic reaction which comprises means for heating the reactants and means for introducing a coolant into the reactor, the improvement which comprises a control system including a first temperature sensing means within said reactor downstream of said coolant introducing means, first control means responsive to said first temperature sensing means for controlling the introduction of coolant into said reactor, second temperature sensing means located within said reactor downstream of said first temperature sensing means, said second sensing means having a response period at least five times that of said first sensing means, and second control means responsive to said second sensing means for setting said first control means.

10. An apparatus in accordance with claim 9 further comprising means for measuring the rate of flow of said coolant, means for controlling said reactant heating means, and third control means responsive to said flow measuring means and to said second control means operative to set said means for controlling the reactant heating means.

11. An apparatus in accordance with claim 10 further comprising means for controlling the ratio of reactants charged to the reactor.

12. An apparatus for controlling an exothermic reaction within an elongated reactor having means for introducing a coolant into said reactor which comprises a first temperature sensing means having a relatively fast response period and a second temperature sensing means having a relatively slow response period, each of said sensing means being located downstream of said coolant introducing means and at substantially the same axial distance therefrom, a first control means responsive to said fast sensing means and operative to control the introduction of coolant in accordance therewith, and second control means responsive to said slower sensing means and operative to set said first control means.

13. An apparatus for controlling an exothermic reaction within an elongated reactor having means for introducing a coolant into said reactor which comprises means responsive to the rate of flow of said coolant for controlling the introduction thereof, temperature sensing means downstream of said coolant introducing means, and control means responsive to said sensing means to set said flow controlling means.

14. An apparatus for controlling an elongated reactor having first and second means for introducing a coolant into said reactor which comprises a first temperature sensing means within said reactor downstream of said first coolant introducing means, first control means responsive to said first sensing means for controlling the introduction of said coolant through said first control means, second sensing means having a response period at least five times that of said first sensing means and located downstream of said first sensing means but upstream of said second coolant introducing means, third control means responsive to said third sensing means for controlling the introduction of coolant through said second introduction means, fourth temperature sensing means adjacent said third temperature sensing means but having a response period longer than that of said third temperature sensing means, and fourth control means responsive to said fourth sensing means and operative to set said third control means.

15. An apparatus in accordance with claim 14 and further comprising third coolant introducing means downstream of said third and fourth sensing means, fifth temperature sensing means downstream of said third coolant introducing means, flow-responsive means for controlling the introduction of coolant through said third coolant introducing means, and fifth control means responsive to said fifth sensing means and operative to set said flow-responsive control means.

16. A thermal hydrodealkylation reactor system comprising an elongated, open bore reactor, heating means, means for controlling the heat input of said heating means, a hydrocarbon feed line, a hydrogen feed line, means for controlling the rate of flow of hydrogen within said hydrogen feed line, means responsive to said hydrogen flow control means for controlling the rate of flow of said hydrocarbon feed in a predetermined ratio to said hydrogen rate of flow, means for admixing said hydrogen and said hydrocarbon feed at a point downstream of said control means, means for passing said admixed stream through said heating means and into said reactor at an inlet end thereof, first coolant introducing means spaced downstream from said inlet end of said reactor, first control means immediately downstream of said coolant introducing means responsive to the temperature of said reactor to control the introduction of said coolant, second control means downstream of said first coolant introducing means responsive to the temperature within said reactor to set said first control means, means for measuring the rate of flow of said coolant, and means responsive to said second control means and said coolant measuring means operative to set said means for controlling the heat input of said heating means.

17. An apparatus in accordance with claim 16 and further comprising second coolant introducing means at a position downstream of said second control means, and means responsive to the temperature downstream of said second coolant introducing means for controlling the introduction of said coolant through said second introducing means.

18. An apparatus in accordance with claim 17 wherein said means responsive to the temperature downstream of said second coolant introducing means comprises a fast temperature sensing means, a slow temperature sensing means, third control means responsive to said fast sensing means operative to control the flow of coolant, and fourth control means responsive to said slow sensing means operative to set said third control means.

19. An apparatus in accordance with claim 18 and further comprising at least one further coolant introducing means within said reactor downstream of said second coolant introducing means, and control means responsive to the reactor temperature downstream of said third coolant introducing means and operative to control the introduction of coolant therethrough.

20. An apparatus in accordance with claim 19 and further comprising means adjacent the outlet of said reactor to quench the hydrodealkylation reaction.

References Cited in the file of this patent

UNITED STATES PATENTS

| | | |
|---|---|---|
| 196,055 | Talcott | Oct. 9, 1877 |
| 850,007 | Huntoon | Apr. 9, 1907 |
| 1,271,719 | Kennedy | July 9, 1918 |
| 2,154,795 | Westenberg | Apr. 18, 1939 |
| 2,252,550 | Bragg | Aug. 12, 1941 |
| 2,331,343 | Phillips | Oct. 12, 1943 |
| 2,409,376 | Mekler | Oct. 15, 1946 |
| 2,653,176 | Beckberger | Sept. 22, 1953 |
| 2,768,219 | Hoffmann et al. | Oct. 23, 1956 |
| 2,895,688 | Seiberling et al. | July 21, 1959 |
| 3,001,533 | Holdren | Sept. 26, 1961 |